(12) United States Patent
Wigsten

(10) Patent No.: US 6,609,986 B1
(45) Date of Patent: Aug. 26, 2003

(54) MECHANICAL TENSIONER COMPRISED OF A RIGID ARM URGED AGAINST CHAIN BY AT LEAST ONE BLADE TYPE SPRING

(75) Inventor: Mark M. Wigsten, Lansing, NY (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 09/439,318

(22) Filed: Nov. 12, 1999

(51) Int. Cl.[7] ............................. F16H 7/08; F16H 7/18
(52) U.S. Cl. .......................... 474/111; 474/140
(58) Field of Search ................ 474/101, 110, 474/111, 109, 112, 117, 113, 140, 133–138

(56) References Cited

U.S. PATENT DOCUMENTS

| | | | |
|---|---|---|---|
| 2,261,316 A | * 11/1941 | Weller | 474/111 |
| 3,463,025 A | * 8/1969 | Turner et al. | 474/111 |
| 4,713,043 A | * 12/1987 | Biedermann | 474/111 |
| 4,921,472 A | 5/1990 | Young | 474/111 |
| 4,976,659 A | * 12/1990 | Hans et al. | 474/111 |
| 5,045,032 A | 9/1991 | Suzuki et al. | 474/140 |
| 5,055,088 A | 10/1991 | Cradduck et al. | 474/111 |
| 5,266,066 A | 11/1993 | White | 474/111 |
| 5,425,680 A | * 6/1995 | Young | 474/111 |
| 5,462,493 A | 10/1995 | Simpson | 474/111 |
| 5,653,652 A | 8/1997 | Simpson | 474/110 |
| 5,662,540 A | 9/1997 | Schnuepke et al. | 474/111 |
| 5,702,318 A | 12/1997 | Hayafune et al. | 474/111 |
| 5,813,935 A | 9/1998 | Dembosky et al. | 474/111 |
| 5,853,341 A | 12/1998 | Wigsten | 474/140 |
| 5,957,793 A | * 9/1999 | Schulze | 474/111 X |
| 5,984,815 A | 11/1999 | Baddaria | 474/111 |

FOREIGN PATENT DOCUMENTS

| | | | | |
|---|---|---|---|---|
| DE | 3637212 | * | 5/1988 | |
| JP | 134055 | * | 8/1982 | 474/111 |
| JP | 155046 | * | 8/1985 | 474/111 |
| JP | 193693 | * | 7/1994 | 474/111 |
| JP | 32895 | * | 2/2001 | |

\* cited by examiner

Primary Examiner—Marcus Charles
(74) Attorney, Agent, or Firm—Greg Dziegielewski; Fitch, Even, Tabin & Flannery

(57) ABSTRACT

A chain tensioner is disclosed which incorporates a blade tensioner and a rigid tensioner arm. The blade tensioner and rigid tensioner arm can be pivotally supported on proximate support structure and the blade tensioner urges the rigid tensioner arm into engagement with a portion of a chain to tension the chain. Alternatively, the blade tensioner can be pivotally mounted on the rigid tensioner arm. Two or more blade tensioners can be used to tension the rigid tensioner arm. If desired, the rigid tensioner arm can be mounted on one of the blade tensioners.

14 Claims, 1 Drawing Sheet

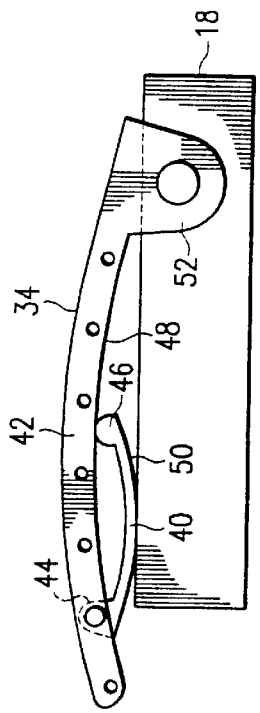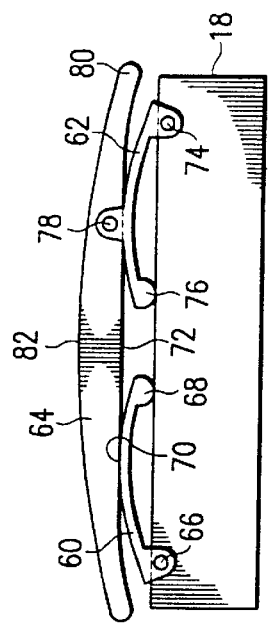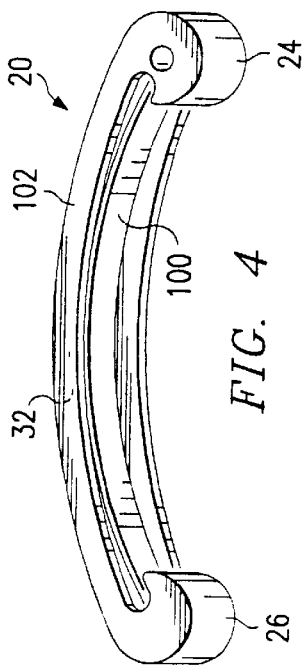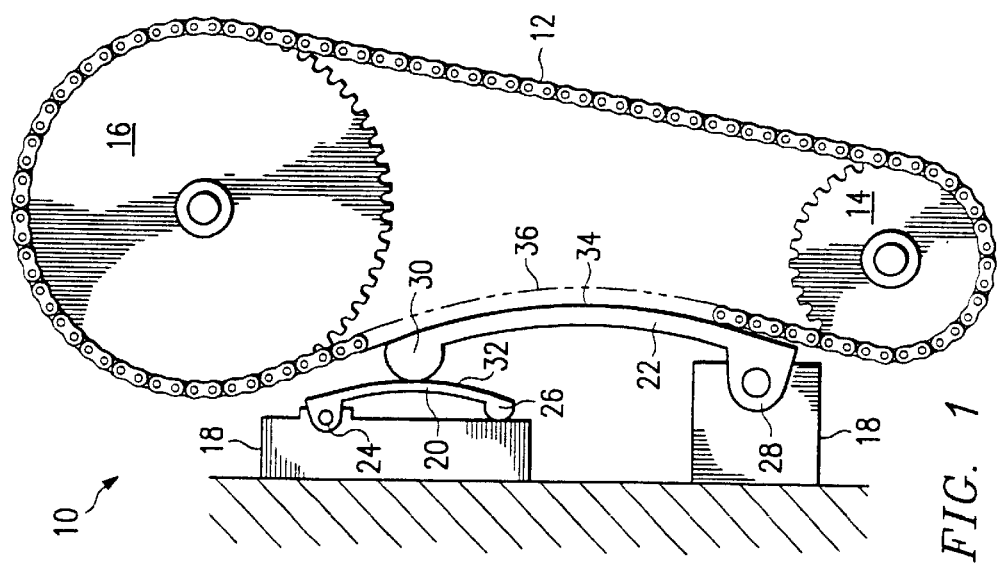

MECHANICAL TENSIONER COMPRISED OF A RIGID ARM URGED AGAINST CHAIN BY AT LEAST ONE BLADE TYPE SPRING

BACKGROUND OF THE INVENTION

Most modern engines commonly utilize a chain drive to drive the camshaft or camshafts off of the crankshaft of the engine. It is common to have one or more guides to guide the chain and a rigid tensioner arm urged against the chain by a hydraulic tensioner using the engine oil pressure as the hydraulic driving force to tension the chain.

While the use of hydraulic tensioners has been satisfactory, they are expensive. A need therefore exists to find other techniques for satisfactorily tensioning chains, but at less cost.

SUMMARY OF THE INVENTION

In accordance with one aspect of the present invention, an apparatus is provided for applying a continuous tension to a chain. The apparatus includes at least one blade tensioner and a rigid tensioner arm engaging a portion of the chain and acted upon by the blade tensioner to tension the chain. The blade tensioner can be mounted on the rigid tension arm or on surrounding structure. The rigid tension arm can be pivotally mounted to the supporting structure or a pair of blade tensioners can be used to support the rigid tensioner arm.

BRIEF DESCRIPTION OF THE DRAWINGS

FIG. 1 is a side view of a first embodiment of the present invention;

FIG. 2 is a side view of a first modification of the first embodiment;

FIG. 3 is a side view of a second modification of the first embodiment; and

FIG. 4 is a perspective view of a spring blade tensioner used in the first embodiment of the present invention.

DETAILED DESCRIPTION OF THE INVENTION

With reference to FIG. 1, a chain tensioning apparatus 10 is illustrated which is used to tension a chain 12 between a drive sprocket 14 and a driven sprocket 16. The drive sprocket 14 can, for example, be mounted on the crankshaft of an engine while the driven sprocket 16 is mounted on the camshaft of the engine. Supporting structure 18, such as the block of an engine, is provided adjacent the chain tensioning apparatus 10 to mount the apparatus.

The chain tensioning apparatus 10 includes a blade tensioner 20 and a rigid tensioner arm 22. The blade tensioner 20 has a pivot end 24 which is pivoted to the supporting structure 18 and a free end 26 which bears against the supporting structure 18. The blade tensioner uses a blade spring 100 interlocked under tension with a single shoe 102 to provide tension (see FIG. 4). The blade spring 100 is arcuate in shape and the shoe 102 is relatively flat. The shoe 102 is constructed from a semi-rigid material which will typically deform or "creep" upon experiencing a load at a higher temperature. The spring blade 100 is flattened to correspond to the shape of the shoe 102 and then interlocked with it. Because the semi-rigid shoe 102 prevents the blade spring 100 from returning to its original, more arcuate shape, the blade spring 100 applies a load to the shoe 102. During operation in an engine, as the heat increases, the temperature of the shoe 102 increases and becomes less rigid and the load from the blade spring 100 causes the shoe 102 to deform to a more arcuate shape. On the shoe 102 is formed a surface 32. Similarly, the rigid tensioner arm 22 has a pivot end 28 pivotally mounted to the supporting structure 18 and a free end 30. The free end 30 engages the surface 32 of the blade tensioner 20.

The chain tensioning apparatus 10 is designed so that the blade tensioner 20, which is formed of a resilient material, engages the free end 30 of the rigid tensioner arm 22 at surface 32 and urges the face 34 of the rigid tensioner arm 22 against a portion 36 of the chain to tension the chain.

Many blade tensioner designs are currently in production. Examples of such designs are disclosed in U.S. Pat. Nos. 4,921,472 and 5,266,066. A tensioner arm design that would be suitable for the chain tensioning apparatus 10 is the laminated tensioner arm design as disclosed in U.S. Pat. No. 5,853,341, the disclosure of which is incorporated by reference herein in its entirety. Also, the multiple spring blade tensioner design of BWA disclosed in U.S. Pat. No. 6,375,587 can be used in the chain tensioning apparatus 10.

A significant advantage of the chain tensioning apparatus 10 is the elimination altogether of the hydraulic tensioning elements previously required for a rigid tensioner arm system utilizing a hydraulic tensioner. Thus, the cost of the chain tensioning apparatus 10 can be reduced over the cost of a system including a hydraulic tensioner.

With reference to FIG. 2, a first modification of the chain tensioning apparatus 10 is disclosed which includes a blade tensioner 40 which is mounted in a rigid tensioner arm 42. The pivot end 44 of the blade tensioner 40 is pivoted to the rigid tensioner arm 42 while the free end 46 bears against the surface 48 of the rigid tensioner arm. The surface 50 of the blade tensioner will act against the supporting structure 18 to provide the force to urge the rigid tensioner arm 42 against the portion 36 of the chain. More than one blade tensioner 40 can be employed, if desired. The pivot end 52 of the rigid tensioner arm 42 is pivoted to the supporting structure 18.

With reference to FIG. 3, a second modification of the chain tensioning apparatus is illustrated. This modification utilizes a first blade tensioner 60, a second blade tensioner 62 and a rigid tensioning arm 64 mounted on the blade tensioners 60 and 62. The first blade tensioner 60 is provided with a pivot end 66 and a free end 68. The pivot end is mounted on the supporting structure 18 while the free end engages the supporting structure 18. The surface 70 of the first blade tensioner acts on the back surface 72 of the rigid tensioner arm. Similarly, the second blade tensioner 62 has a pivot end 74 which is pivotally supported on the supporting structure 18 and a free end 76 which engages the supporting structure 18. However, blade tensioner 62 differs from blade tensioner 60 in having a pivot attachment 78 which pivotally engages the rigid tensioner arm 64 near end 80 of the rigid tensioner arm. The pivotal attachment between the second blade tensioner 62 and the rigid tensioner arm 64 supports the rigid tensioner arm 64. Both of the blade tensioners 60 and 62 act to urge the face 82 of the rigid tensioner arm 64 into engagement with the chain portion 36.

While a certain embodiment of the apparatus of the present invention has been presented, it is appreciated that the invention is not limited thereto. Many variations, substitutions and amendments can be made to this embodiment without departing from the scope of the invention. Such variations, substitutions and amendments as would be apparent to one having ordinary skill in the art who would be familiar with the teaching disclosed herein are also deemed to fall within the scope and spirit of the present invention as hereinafter claimed.

What is claimed is:

1. A tensioning apparatus for applying a continuous tension to a chain, the apparatus comprising:
    at least one blade tensioner, said blade tensioner having a shoe pivotally mounted at a first end and freely mounted at a second end, said shoe having a spring blade contained therein; and
    a rigid tensioner arm engaging a portion of a chain, said tensioner arm pivotally mounted at a first end to a support and in contact with said shoe at a second end, said shoe of said blade tensioner exerting sufficient force on said second end of said rigid tensioner arm to cause the movement of said arm against the chain effective to apply said continuous tension to said chain.

2. The tensioning apparatus of claim 1 wherein the shoe moves toward the rigid tensioner arm.

3. The tensioning apparatus of claim 1 wherein the first end of said shoe of the blade tensioner is pivotally mounted on the rigid tensioner arm.

4. The tensioning apparatus of claim 3 wherein the shoe moves away from the rigid tensioner arm and against a support structure.

5. The tensioning apparatus of claim 1 for use with a supporting structure proximate the chain, said first end of said shoe of said blade tensioner pivotally mounted on the supporting structure.

6. The tensioning apparatus of claim 5 wherein the first end of the rigid tensioner arm is pivotally mounted on the supporting structure.

7. The tensioning apparatus of claim 1 wherein the second end of the rigid tensioner arm is supported on the shoe of the blade tensioner.

8. A tensioning apparatus for applying a continuous tension to a chain, the apparatus comprising:
    a tensioner arm pivotally mounted at a first end thereof to a support; and
    a blade spring tensioner acting against the tensioner arm at a second end of the tensioner arm, said second end of the tensioner arm contacting a portion of said blade spring tensioner generally about the apex of curvature of the blade spring tensioner.

9. The tensioning apparatus of claim 8 further comprising a shoe, the blade spring mounted to an engine, the shoe pressing against the tensioner arm.

10. A tensioning apparatus for applying a continuous tension to a chain, the apparatus comprising:
    first and second blade tensioners, said first blade tensioner having a shoe pivotally mounted at a first end and freely mounted at a second end, said shoe having a spring blade contained therein; and
    a rigid tensioner arm engaging a portion of a chain, said tensioner arm pivotally mounted at a first end, said shoe of said first blade tensioner acting on the first end of said rigid tensioner arm and said second blade tensioner acting on a second end of said rigid tensioner arm, operation of said chain causing movement of said tensioners resulting in movement of said arm against the chain.

11. The tensioning apparatus of claim 10 wherein the first end of the rigid tensioner arm is pivotally mounted to the first blade tensioner.

12. The tensioning apparatus of claim 11 wherein the shoe of the first blade tensioner moves toward the rigid tensioner arm.

13. A tensioner apparatus for applying a continuous tension to a chain, the apparatus comprising:
    a tensioner arm pivotally mounted at a first end thereof to a first blade spring tensioner; and
    a second blade spring tensioner acting against the tensioner arm at a second end of the tensioner arm.

14. A tensioner apparatus for applying a continuous tension to a chain, the apparatus comprising:
    a tensioner arm pivotally mounted at a first end thereof to a support; and
    a blade spring tensioner pivotably mounted on the tensioner arm and acting on a support to bias a second end of the tensioner arm.

* * * * *